US012280830B2

(12) United States Patent
Carl

(10) Patent No.: US 12,280,830 B2
(45) Date of Patent: Apr. 22, 2025

(54) BODYWORK SUPPORT STRUCTURE FOR A VEHICLE, IN PARTICULAR FOR A PASSENGER MOTOR CAR, AS WELL AS A VEHICLE

(71) Applicant: Mercedes-Benz Group AG, Stuttgart (DE)

(72) Inventor: Michael Carl, Gerlingen (DE)

(73) Assignee: Mercedes-Benz Group AG, Stuttgart (DE)

(*) Notice: Subject to any disclaimer, the term of this patent is extended or adjusted under 35 U.S.C. 154(b) by 350 days.

(21) Appl. No.: 18/000,999

(22) PCT Filed: May 21, 2021

(86) PCT No.: PCT/EP2021/063568
§ 371 (c)(1),
(2) Date: Dec. 7, 2022

(87) PCT Pub. No.: WO2021/249741
PCT Pub. Date: Dec. 16, 2021

(65) Prior Publication Data
US 2023/0211826 A1 Jul. 6, 2023

(30) Foreign Application Priority Data
Jun. 8, 2020 (DE) ...................... 10 2020 003 433.0

(51) Int. Cl.
*B62D 25/02* (2006.01)
*B60K 1/04* (2019.01)
(Continued)

(52) U.S. Cl.
CPC ......... *B62D 25/025* (2013.01); *B62D 21/157* (2013.01); *B60K 1/04* (2013.01);
(Continued)

(58) Field of Classification Search
CPC .............. B62D 25/025; B62D 25/2036; B62D 21/157; B62D 27/023; B60K 1/04; B60K 2001/0438; B60Y 2306/01
(Continued)

(56) References Cited

U.S. PATENT DOCUMENTS

| 6,428,085 B1 | 8/2002 | Miyasaka et al. |
| 8,696,051 B2 | 4/2014 | Charbonneau et al. |

(Continued)

FOREIGN PATENT DOCUMENTS

| DE | 196 22 675 C2 | 12/1997 |
| DE | 100 28 716 B4 | 6/2001 |

(Continued)

OTHER PUBLICATIONS

JP4329379 Text (Year: 2015).*

(Continued)

*Primary Examiner* — Dennis H Pedder
(74) *Attorney, Agent, or Firm* — Crowell & Moring LLP

(57) ABSTRACT

A bodywork support structure for a vehicle includes two side sills that are spaced apart in a transverse direction where the two side sills have a reinforcing element that is disposed in a hollow space. A floor is disposed between the two side sills and connected to the two side sills and an energy store for storing electrical energy and/or a fuel for powering the vehicle is disposed under the floor. The reinforcing element is formed as a corner reinforcement disposed in a corner area where the corner reinforcement has a first connection area that is attached to an external wall, a second connection area that is attached to a lower flange, and a wall area that connects the first and second connection areas with each other across the corner. An open space is formed between the corner reinforcement and an internal wall in the transverse direction of the vehicle.

14 Claims, 8 Drawing Sheets

(51) Int. Cl.
*B62D 21/15* (2006.01)
*B62D 27/02* (2006.01)
*B60K 15/03* (2006.01)
*B62D 25/20* (2006.01)

(52) U.S. Cl.
CPC ...... *B60K 2001/0438* (2013.01); *B60K 15/03* (2013.01); *B62D 25/2036* (2013.01)

(58) Field of Classification Search
USPC .............................. 296/209, 29, 30, 187.12
See application file for complete search history.

(56) References Cited

U.S. PATENT DOCUMENTS

| | | | |
|---|---|---|---|
| 10,822,035 | B2 | 11/2020 | Takahashi |
| 2004/0119321 | A1 | 6/2004 | Kasuga |
| 2016/0194032 | A1 | 7/2016 | Yamamoto et al. |
| 2019/0359265 | A1 | 11/2019 | Tsuyuzaki et al. |

FOREIGN PATENT DOCUMENTS

| | | |
|---|---|---|
| DE | 600 17 033 T2 | 12/2005 |
| DE | 603 00 880 T2 | 12/2005 |
| DE | 10 2008 019 167 A1 | 11/2009 |
| DE | 10 2008 056 507 A1 | 5/2010 |
| DE | 10 2012 206 032 A1 | 10/2013 |
| DE | 10 2015 203 309 A1 | 8/2016 |
| DE | 10 2018 115 828 A1 | 1/2019 |
| DE | 10 2018 219 023 A1 | 5/2019 |
| JP | 4329379 B2 * | 9/2009 |
| JP | 5831358 B2 * | 12/2015 |
| WO | WO 2019/096675 A1 | 5/2019 |

OTHER PUBLICATIONS

JP5831358 Text (Year: 2009).*
PCT/EP2021/063568, International Search Report dated Sep. 21, 2021 (Two (2) pages).

* cited by examiner

BODYWORK SUPPORT STRUCTURE FOR A VEHICLE, IN PARTICULAR FOR A PASSENGER MOTOR CAR, AS WELL AS A VEHICLE

BACKGROUND AND SUMMARY OF THE INVENTION

The invention relates to a bodywork support structure for a vehicle, in particular for a passenger motor car. Furthermore, the invention relates to a vehicle with such a bodywork support structure.

U.S. Pat. No. 8,696,051 B2 discloses a side impact system for absorbing and distributing energy for a vehicle, with a pair of side sill arrangements, which are spaced apart from each other in the transverse direction of the vehicle. Furthermore, a lower vehicle structure is known from DE 10 2018 115 828 A1 which comprises a right and a left side sill. The side sills are arranged on opposite sides in a widthwise direction of the vehicle.

It is the object of the present invention to provide a bodywork support structure for a vehicle and such a vehicle, so that an especially advantageous crash behavior can be achieved, in particular for a side impact or side collision.

A first aspect of the invention relates to a bodywork support structure for a vehicle, in particular for a motor vehicle. The motor vehicle can preferably be formed as a motor car and very preferably as a passenger motor car. The bodywork support structure has two side sills that are spaced apart from each other in the transverse direction of the vehicle. The bodywork support structure comprises, for example, a preferably self-supporting car body or a shell of such a preferably self-supporting car body. The side sills are preferably components of the bodywork structure or of the shell. The respective side sill has a hollow space, also referred to as a hollow space of the sill, which can in particular be formed by a hollow cross section, preferably by a closed hollow cross section of the respective side sill. In particular, the hollow space extends at least over a respective longitudinal area of the respective side sill that runs in the longitudinal direction. The respective hollow space is at least partially, in particular at least mostly or completely, delimited outwards in the transverse direction of the vehicle by a respective external wall of the respective side sill. The external wall is also referred to as the outer wall or the outer wall of the sill. The respective hollow space is at least partially, in particular at least mostly or completely, delimited inwards in the transverse direction of the vehicle by a respective internal wall of the respective side sill, wherein the internal wall is also referred to as the inner wall of the sill. The respective hollow space is at least partially, in particular at least mostly or completely, delimited downwards in the vertical direction of the vehicle by a respective lower flange of the respective side sill, wherein the lower flange is also referred to as the sill floor or the bottom of the sill, or is arranged on a bottom of the respective side sill that faces downwards in the vertical direction of the vehicle. At least one reinforcing element is arranged in the respective hollow space, which element is formed separately from the respective side sill. The respective hollow space is at least partially, in particular at least mostly or completely, delimited upwards in the vertical direction of the vehicle by a respective upper flange of the respective side sill. The respective corner reinforcement is hereby spaced apart from the respective upper flange and is thus not attached to the respective upper flange. The respective side sill can thereby be selectively reinforced in such a way that an excessive and therefore unfavourable reinforcement of the side sill is omitted and instead, the previously-described advantageous displacement of the reinforcing element occurs. In other words, an excessive or excessively broad reinforcement, that could undermine the previously described displacement of the reinforcing element, can be avoided by distancing the corner reinforcement from the internal wall and preferably also from the upper flange.

The bodywork support structure also comprises a floor that is arranged between the side sills in the transverse direction of the vehicle and is connected, in particular on both sides, to the side sills, by means of which floor, for example, an interior of the vehicle, that is also referred to as the passenger compartment or passenger space, can be delimited or is at least partially, in particular at least mostly or completely delimited downwards in the vertical direction of the vehicle. The floor is also referred to as the main floor and is preferably a component of the body or of the shell. The floor is therefore also referred to as the bodywork floor or the shell floor.

An open space or intermediate space, for example filled with air, is arranged between the internal wall and the corner reinforcement in the transverse direction of the vehicle. This is in particular to be understood to mean that no other further physical component is arranged between the corner reinforcement and the internal wall in the transverse direction of the vehicle, so that the open space is free of components. The deformation of the non-reinforced area of the lower flange described in the following and thus the advantageous, accident-induced displacement of the corner reinforcement can therefore be ensured, so that this can function especially well as the block described in the following.

Furthermore, the bodywork structure comprises at least one energy store, that is arranged under the floor in the vertical direction of the vehicle, for storing electrical energy for powering the vehicle and/or for storing a fuel, that is, for example, liquid or gaseous, for powering the vehicle. The energy store is preferably formed separately from the body, and is held, in particular in a reversibly detachable manner, on the bodywork. The energy store is preferably arranged under the floor in such a way that the floor is at least partially, in particular at least mostly or completely, overlapped or covered by the energy store at the bottom in the vertical direction of the vehicle. The energy store can be an electrical energy store or can comprise an electrical energy store, wherein electrical energy or electricity for electrically powering the vehicle is to be stored or is stored by means of the electrical energy store. Since the electrical energy to be stored or that is stored in the electrical energy store is used for powering the vehicle, the electrical energy store is also referred to as the traction store. The electrical energy store can be a battery, in particular a high-voltage battery (HV battery), so that the electrical energy store is then referred to as the traction battery. Furthermore, the energy store can be a tank or at least comprise a tank, in which a gaseous or liquid fuel for powering the vehicle, in particular by means of an internal combustion engine, is stored or is to be stored. The tank can therefore be a fuel tank or a gas tank.

In order to now be able to achieve especially advantageous crash behavior and to thus be able to protect in particular the energy store especially well, in particular for a side impact or side collision in which a crash barrier or an impacting vehicle collides inwards against the vehicle in the transverse direction of the vehicle and thus in particular against one of the side sills, wherein the one side sill is arranged on a side on which the crash barrier collides against the vehicle, it is provided according to the invention that the reinforcing element is formed as a corner reinforcement, which is arranged in a respective corner area of the respective side sill that is delimited by the lower flange and by the external wall. The corner reinforcement has at least one first connection area, which is, in particular directly, attached to the external wall. This means that the corner reinforcement is attached, in particular directly, to the external wall via the first connection area. Furthermore, the corner reinforcement has at least one second connection area which is, in particular directly, attached to the lower flange. The corner reinforcement is therefore attached, in particular directly, to the lower flange via its second connection area, i.e., is connected with the lower flange. Furthermore, the corner reinforcement comprises at least one wall area that extends into the corner area and thus over the corner, which extends in the transverse direction of the vehicle and in the vertical direction of the vehicle. The wall area thus connects the connection areas with each other across the corner, so that the connection areas are connected with each other across the wall area. It can in particular be provided that the first connection area and/or the second connection area are formed integrally with the wall area. In other words, the connection areas and the wall area are, for example, formed by respective walls of the corner reinforcement, wherein the walls are preferably formed integrally with each other.

The corner reinforcement is also spaced apart from the internal wall in the transverse direction of the vehicle, so that the corner reinforcement does not touch the internal wall and is not connected to the internal wall. The respective side sill can thereby be selectively and effectively reinforced in its respective corner area by means of the respective corner reinforcement, so that, for example in the case of a crash, such as a side impact or side collision, the energy store can be especially well protected by means of the respective side sill. The bodywork support structure, also referred to as the bodywork structure, can in particular have the following modes of action in a crash, in particular in a side impact or side collision: In such a side impact of a crash barrier on or against the respective side sill, also simply referred to as the sill, this can initially deform in an energy-absorbing manner, i.e., by consuming energy, before an excessive load path is built up in the energy store and thus, for example, in a housing and/or a support frame of the energy store. During the further course of the side impact and thus with the progressive deformation of the side sill, its corner area, that is provided with the corresponding corner reinforcement, is displaced inwards in the transverse direction of the vehicle and downwards in the vertical direction of the vehicle, which can be promoted by a deformation of a non-reinforced area of the lower flange. This non-reinforced area of the lower flange is, for example, such an area in which the corner reinforcement is not arranged because the corner reinforcement is spaced apart from the internal wall in the transverse direction of the vehicle. The non-reinforced area of the lower flange is thus arranged between the internal wall and the corner reinforcement in the transverse direction of the vehicle. Expressed in yet other words, the non-reinforced area of the lower flange begins, for example viewed inwards in the transverse direction of the vehicle, where the corner reinforcement ends. The non-reinforced area of the lower flange can thus end at the internal wall, as viewed inwards in the transverse direction of the vehicle, on which, for example, the lower flange ends inwards in the transverse direction of the vehicle.

By means of the described displacement of the corner area inwards and downwards, the corner reinforcement is shifted or lowered downwards in the vertical direction of the vehicle (z direction) to the level of a fastening flange of the energy store, in particular of the housing or of the support frame, so that the corner reinforcement is a block between the crash barrier and the energy store, in particular the housing or the support frame. The energy store is, for example, preferably indirectly fixed to the floor and/or to the side sill by means of the previously mentioned fastening flange. The feature that the corner reinforcement is a block between the crash barrier and the energy store, in particular the housing or the support frame, should in particular be understood to mean that the corner reinforcement forms a block as a consequence of its described displacement inwards and downwards, which is arranged between the crash barrier and the energy store, in particular the fastening flange, in the transverse direction of the vehicle, and thus, for example, lies at least indirectly on the crash barrier, on the outside in the transverse direction of the vehicle, and at least indirectly on the energy store, on the inside in the transverse direction of the vehicle, in particular on the housing or the support frame, preferably without there being a path between the block and the crash barrier or between the block and the energy store in the transverse direction of the vehicle that is still deformable or that can still be driven back by deformation. An advantageous load path thereby ultimately occurs from the crash barrier, via the corner reinforcement, into the energy store, in particular into its support frame or housing. By means of the described displacement of the corner reinforcement inwards and downwards, this additional load path is arranged under an original storage area of the energy store, that is formed for storing the electrical energy store or the fuel, in the vertical direction of the vehicle, so that excessive loads on the storage area can be avoided, and the storage area can be advantageously protected. Storage cells, in particular battery cells, for storing electrical energy are, for example, arranged in the storage area and/or at least one receiving chamber is arranged in the storage area, into which the fuel can be received or is received. Impact or crash energy can thus be guided around the storage area via the additional load path, whereby the storage area can be advantageously protected.

In order to especially advantageously reinforce or stiffen the respective side sill in its corner area and consequently to be able to protect the energy store especially well, it is provided in an embodiment of the invention that the corner reinforcement is formed as a wedge shape.

It has shown itself to be especially advantageous here if the wedge-shaped corner reinforcement tapers inwards in the transverse direction of the vehicle. This should in particular to be understood to mean that a top side of the corner reinforcement, in particular of the wall area, that faces upwards in the vertical direction of the vehicle, runs from the outside top to the inside bottom in the transverse direction of the vehicle. The corner area can thereby be especially selectively reinforced as required, so that this leads to the previously described, especially advantageous displacement of the corner reinforcement, in particular as a result of the deformation of the non-reinforced area of the lower flange.

In order to be able to protect the energy store especially well, it is provided in a further configuration of the invention that the energy store is at least partially covered by the respective side sill and/or by the respective corner reinforcement on the outside in the transverse direction of the vehicle. It can thereby be ensured that the side sill initially, i.e., at the beginning of the side impact, can advantageously absorb energy and consequently deform in such a way that the advantageous additional load path is formed and crash energy can therefore be guided around the storage area.

A further embodiment provides that a holding device connects to the respective side sill on the inside in the transverse direction of the vehicle, which holding device is fixed on the respective side sill and/or on the floor. Preferably, the holding device is fixed to a respective inner side of the respective side sill that faces inwards in the transverse direction of the vehicle and thus, for example, faces the energy store. The energy store, in particular its housing or support frame, is thereby fixed to the holding device, so that the energy store is preferably held on the floor or on the side sill, exclusively through the arrangement of the holding device. Excessively early, loads caused by an accident on the side sill, in particular in the case of a side impact, can thereby be avoided, so that the energy store can be especially well protected.

It has been shown to be especially advantageous here if a fastening of the energy store onto the lower flange is omitted. In other words, it is preferably provided that the energy store is not itself attached to the lower flange and thus not to the side sill, rather the energy store is preferably fixed to the side sills or to the floor exclusively through the arrangement of the holding device. It can thereby be ensured that the respective side sill can initially deform in the case of a side impact and thus absorb energy, without this leading to an early, excessive load on the energy store.

In order to be able to especially advantageously form the previously mentioned block and thus guide crash energy around the dedicated storage area of the energy store especially well, it is provided in a further configuration of the invention that the previously mentioned fastening flange of the energy store, via which fastening flange the energy store is fixed to the holding device, is at least partially arranged lower than the respective lower flange in the vertical direction of the vehicle.

Finally, it has been shown to be especially advantageous if the respective side sill is formed in a shell construction. This should in particular be understood to mean that the respective side sill has at least or exactly two plate elements, wherein the respective plate element can, for example, be formed integrally. The plate elements are assembled and connected with each other, in particular via respective attaching flanges, whereby, for example, the respective side sill is formed. The respective hollow space is respectively partially formed by the respective plate element.

It has furthermore been shown to be advantageous if the respective side sill is formed as an extruded profile, and preferably as a single piece. Customized cross sections or compartments of the side sill can thereby, for example, be achieved, so that an especially high protection of the energy store can be created.

A second aspect of the invention relates to a vehicle that is preferably formed as a motor vehicle, in particular as a motor car and, here, very preferably as a passenger motor car, which has a bodywork structure according to the first aspect of the invention. Advantages and advantageous configurations of the first aspect of the invention are to be seen as advantages and advantageous configurations of the second aspect of the invention, and vice versa.

Preferably, the vehicle is formed as a hybrid or electric vehicle. The electric vehicle can, in particular, be a battery electric vehicle (BEV), which can be electrically powered, in particular purely electrically powered, by means of the energy to be stored or stored in the electrical energy store. The vehicle has, for example, at least one electric machine, which can be supplied with the electrical energy store saved or to be saved in the energy store. The electric machine can thereby be operated as an electric motor, by means of which the vehicle can be electrically powered, in particular purely electrically powered. The energy store or the electrical energy store preferably has an electrical voltage, in particular an electrical operating voltage or rated voltage, which preferably equals at least 48 volts and very preferably is larger than 50 volts, in particular larger than 60 volts. In particular, the electrical voltage equals several hundred volts in size, in order to thereby be able to achieve especially high electrical performances for electrically powering the vehicle.

Further advantages and details of the invention arise from the following description and with the aid of the drawings.

DETAILED DESCRIPTION OF THE DRAWINGS

Figure 1:
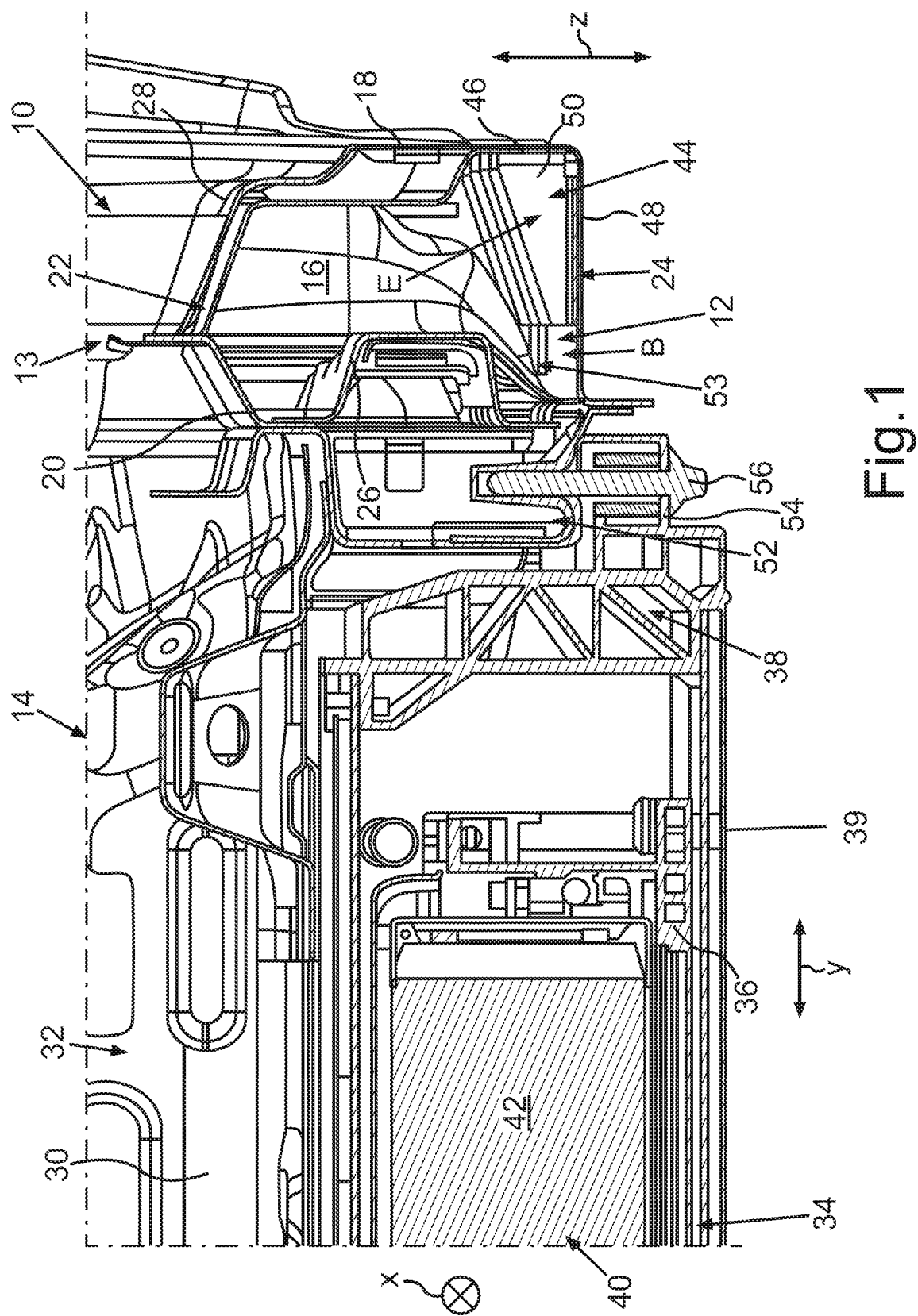
FIG. 1 shows a partial, schematic section of a front view of a bodywork support structure for a vehicle, with two side sills that are spaced apart from each other in the transverse direction of the vehicle, which are reinforced in their respective corner region by at least one corner reinforcement that extends across the corner.

In the figures, identical or functionally identical elements are provided with the same reference numerals.

FIG. 1 shows a bodywork support structure 10 for a vehicle, in particular for a passenger motor car, also simply referred to as a bodywork structure, in a partial, schematic section of a front view. The bodywork support structure 10 has two side sills, also referred to as side longitudinal supports, which are spaced apart from each other in the transverse direction of the vehicle, of which a side sill labelled with the reference numeral 12 can be identified in FIG. 1. The bodywork support structure 10 here comprises, for example, a self-supporting a car body 14, that is also referred to as a shell, wherein the side sill 12 is a component of the car body 14. The preceding and following statements about the side sills 12 can simply be applied to the other side sills that cannot be identified in the figures, and vice versa. In particular, the side sills 12 can be partially or, if necessary, also completely a component of a side wall structure 13, which can be a component of the car body 14. The side wall structure 13 at least partially delimits the interior of the vehicle, which is also referred to as the passenger compartment or passenger space, in the transverse direction of the vehicle (y direction) outwards.

The transverse direction of the vehicle is also referred to as the y direction and is illustrated by an arrow y in FIG. 1. The vertical direction of the vehicle is also referred to as the z direction and is illustrated by an arrow z in FIG. 1. Finally, the longitudinal direction of the vehicle is also referred to as the x direction and is illustrated by an arrow x in FIG. 1.

The side sill 12 has a hollow space 16, which is delimited by an external wall 18 on the outside in the transverse direction of the vehicle (y direction in the vehicle coordinate system), by an internal wall 20 on the inside in the transverse direction of the vehicle, by an upper flange 22 at the top in the vertical direction of the vehicle (z direction in the vehicle coordinate system) and by a lower flange 24 of the side sill 12 at the bottom in the vertical direction of the vehicle. In the exemplary embodiment shown in the figures, the side sill 12 is formed in a shell construction, so that the side sill 12 has several, in the exemplary embodiment shown in the in the figures exactly two, plate elements 26 and 28 that are formed separately to each other and are connected with each other. Here, the external wall 18 is formed by the plate element 28, and the internal wall 20 is formed, among other things, by the plate element 26. The upper flange 22 is partially formed by the plate element 28 and partially formed by the plate element 26, 20, and the lower flange 24 is formed by the plate element 28.

It still remains to be noted that the two fastening flanges protrude from the upper flange between the plate elements 26, 28 or out of the lower flange in the z direction, so that their attachment contact surfaces are respectively arranged in a plane that extends in the x-z direction. It can be inferred without further information from the figures that the two fastening flanges are offset from each other in the transverse direction of the vehicle, so are not arranged exactly under each other.

The plate element 28 is arranged outside the plate element 26 in the transverse direction of the vehicle, so the plate element 28 is, for example, also referred to as the outer part and the plate element 26 is, for example, also referred to as the inner part of the side sill 12. As can be especially well identified with an overall view of the FIGS. 2 to 4 and will be explained in even more detail in the following, several reinforcement elements are arranged in the hollow space 16, which are formed separately from each other and separately from the side sills 12. The reinforcement elements are also arranged consecutively to each other and spaced apart from each other in the longitudinal direction of the vehicle. In a further exemplary embodiment of the invention that is not illustrated in the figures, a reinforcement element is only provided in the respective sill or hollow space of a sill.

The bodywork support structure 10 also comprises a floor 30 that is arranged between the side sills 12 in the transverse direction of the vehicle, which floor is, for example, a component of the car body 14. In particular, the floor 30 is a component of a chassis structure 32, which can preferably be a component of the car body 14. The floor 30 and thus the chassis structure 32 are attached to the side sills, i.e., are connected, in particular directly, with the side sills, so that the respective side wall structure 13 is fixed to the chassis structure 32.

The bodywork support structure 10 also comprises an energy store 34 that is arranged under the floor 30, which is formed as an electrical energy store, and preferably as a battery, in particular as a high-voltage battery, in the exemplary embodiment shown in the figures. Electrical energy or electricity can thus be stored in the energy store 34 or by means of the energy store 34, by means of which the vehicle can be powered, in particular purely electrically. The energy store 34 is hereby arranged under the floor 30 in the vertical direction of the vehicle in such a way that the floor 30 is overlapped or covered, at least partially, in particular at least mostly or completely, at the bottom in the vertical direction of the vehicle by the energy store 34.

The energy store 34 comprises a store housing 36 and a support structure 38. The store housing 36 can be formed separately from the support structure 38 and can be connected with the support structure 38, in particular in a reversibly detachable manner. The support structure 38 is, for example, a support frame, on which the store housing 36 is fixed, in particular in a reversibly detachable manner. The store housing 36 is thereby supported by the support structure 38. Here, the energy store 34 is—as is explained in still more detail in the following—indirectly attached to the floor 30 and/or the side sills by means of the support structure 38. The store housing 36 delimits at least one storage area 40 with a receiving chamber 42, in which storage cells that are not shown in detail in the figures, in particular battery cells, for storing the electrical energy are arranged. The storage area 40 is covered or sealed at the bottom, so towards a road that is not shown, by means of a base plate 39, which is formed in several layers in the exemplary embodiment according to FIG. 1, i.e., it has several plates/covering plates and can also be constructed, in particular, as a huge single plate or as plates in a sandwich construction, in an exemplary embodiment that is not illustrated. The base plate 39 is hereby part of the support structure 38, which is here formed as a support frame. The support frame is therefore sealed at the bottom by means of the base plate 39.

In order to now be able to especially advantageously protect the energy store 34, in particular its storage area 40 that accommodates the relatively delicate storage cells, in particular in the case of a side impact, also referred to as a side collision, of a collision partner with the vehicle or with the car body at the level of the side sill, and thus to be able to achieve an especially good crash behavior of the vehicle, the respective reinforcing element is formed as a corner reinforcement 44, which is arranged in a corner area E of the side sill 12 that is delimited by the lower flange 24 and by the external wall 18 and thereby extends across the corner. The corner reinforcement 44 has at least one first connection area 46 that is attached, in particular directly, to the external wall 18. Furthermore, the corner reinforcement 44 has at least one second connection area 48 that is attached, in particular directly, to the lower flange 24. Furthermore, the corner reinforcement 44 has a wall area 50 that extends in the transverse direction of the vehicle and in the vertical direction of the vehicle, and hereby across the corner, by means of which the connection areas 46 and 48 are connected with each other across the corner. The corner reinforcement 44 is also spaced apart from the internal wall 20 in the transverse direction of the vehicle in such a way that an open space 53 that is open and filled with, for example, air, is arranged between the corner reinforcement 44 and the internal wall 20 in the transverse direction of the vehicle. The open space 53 is delimited to the bottom in the vertical direction of the vehicle by an area B of the lower flange 24. The area B is a non-reinforced area of the lower flange 24, since the corner reinforcement 44 is not arranged in the area B and is not attached to the lower flange 24 in the area B. The area B is arranged in a manner so that it does not overlap the corner reinforcement 44, and vice versa. The connection area 46 is, for example, formed by a first wall of the corner reinforcement 44, wherein the second connection area 48 is, for example, formed by a second wall of the corner reinforcement 44. The wall area 50 can also be formed by a third wall of the corner reinforcement 44. The third wall is, for example, formed integrally with the first wall and/or with the second wall. In particular, the first or second wall can form a respective joining flange, which is attached, in particular directly, to the external wall 18 or to the lower flange 24. For example, the respective joining flange is connected to the external wall 18 or to the lower flange 24 in a cohesive material joint. It is hereby in particular conceivable that the respective joining flange is bonded and/or welded to the external wall 18 or to the lower flange 24.

The side sill 12 can be especially cost-, weight- and space-efficiently as well as selectively and effectively reinforced or stiffened in its corner area E by means of the corner reinforcement 44. Here, the side sill 12 is, in particular regarding its reinforcement by means of the corner reinforcement 44, modularly reinforceable or modularly adaptable, in particular in different design variants and/or vehicle derivatives and/or configurations of the vehicle. The modular adaptability of the side sill can in particular be understood to mean that a respective size of the respective corner reinforcement 44, in particular a respective length of the respective corner reinforcement 44 that runs in the transverse direction of the vehicle and/or in the longitudinal direction of the vehicle, and/or a material from which the corner reinforcement 44 is formed and/or an amount of corner reinforcements 44 arranged in the corner area E can be appropriately adjusted or selected, in order to thereby be able to appropriately, selectively and effectively reinforce the side sill 12 in its corner area E. The side sill can thus be advantageously adapted to different vehicles or vehicle derivatives, which, for example, are based on a common plate shape, but have higher requirements concerning the safety or the protection of the energy store 34 and/or of other electrical components, compared to a basic vehicle.

Conventionally, side sills are strengthened or reinforced by incorporating space-intensive, weight-intensive and high-cost aluminium extruded profiles, which typically extend across the whole width of the side sill, which extends in the transverse direction of the vehicle, or its hollow space and/or the side sill is created by a space-intensive, weight-intensive and high-cost extruded profile, in particular an aluminium extruded profile, which cannot be adapted to different vehicle configurations, in particular with a common plate shape, in a modular and localised manner. However, such a modular adaptation is now possible, since the reinforcement elements, which are formed as corner reinforcements 44, are formed separately from each other and separately from the side sill 12, and can be appropriately formed or selected in terms of their number and/or size and/or material. An advantageous deformation of the side sill 12, in particular of the non-reinforced area B, can also be ensured—as is explained in yet more detail in the following—by means of the distancing of the corner reinforcement 44 from both the internal wall 20 and also from the upper flange 22, from which deformation an especially advantageous displacement of the corner reinforcement 44 inwards and downwards in the transverse direction of the vehicle can result.

Figure 2:
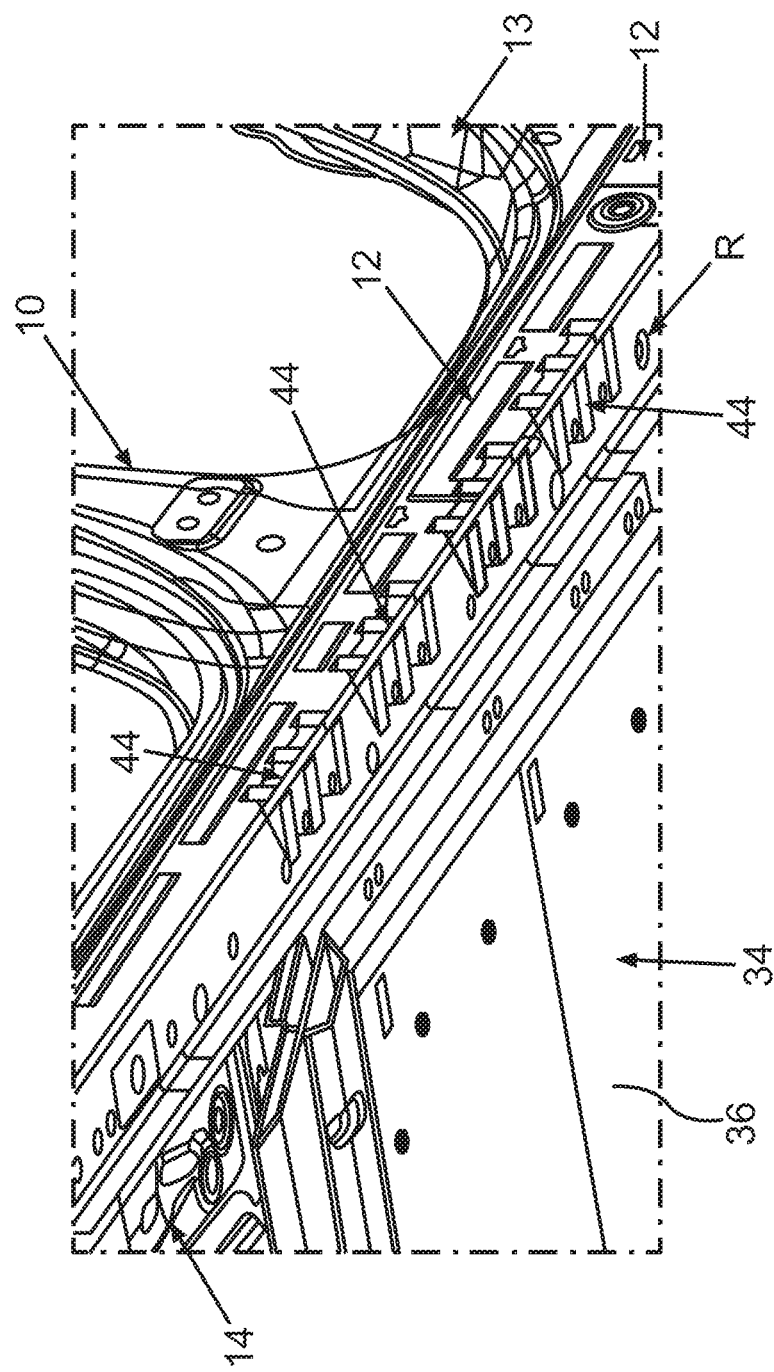
FIG. 2 shows a partial, schematic perspective view of the bodywork support structure from diagonally below it.
Figure 3:
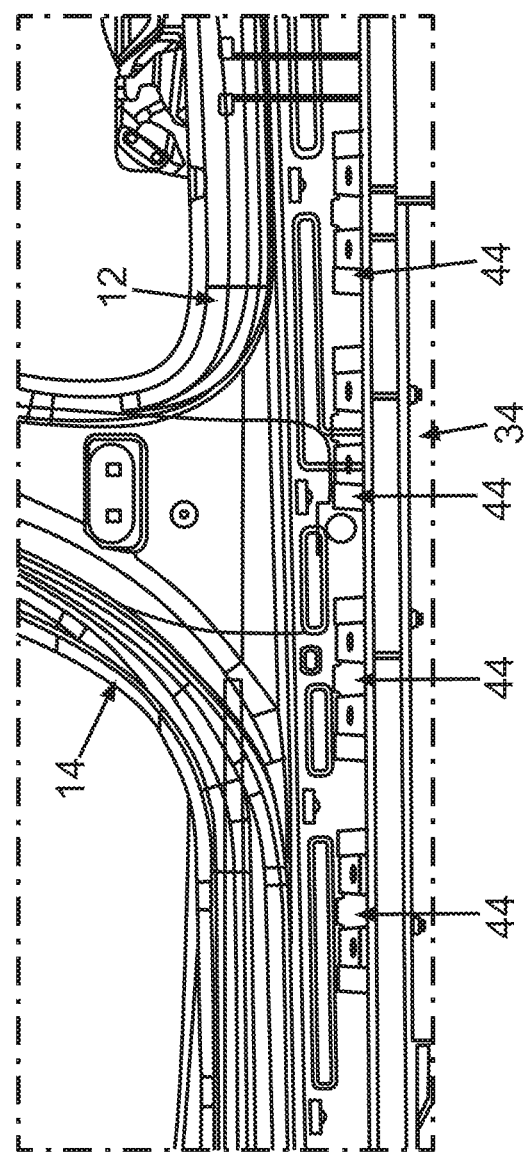
FIG. 3 shows a partial, schematic side view of the bodywork support structure from outside it.
Figure 4:
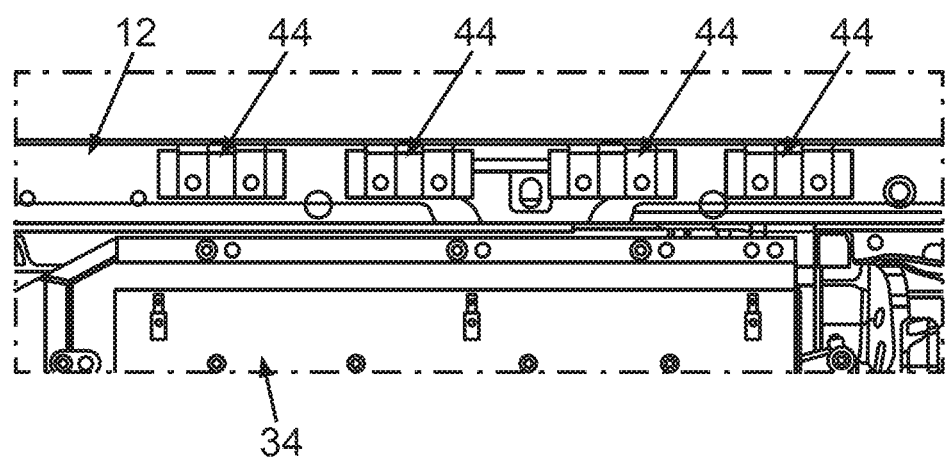
FIG. 4 shows a partial, schematic bottom view of the bodywork support structure.
Figure 5:
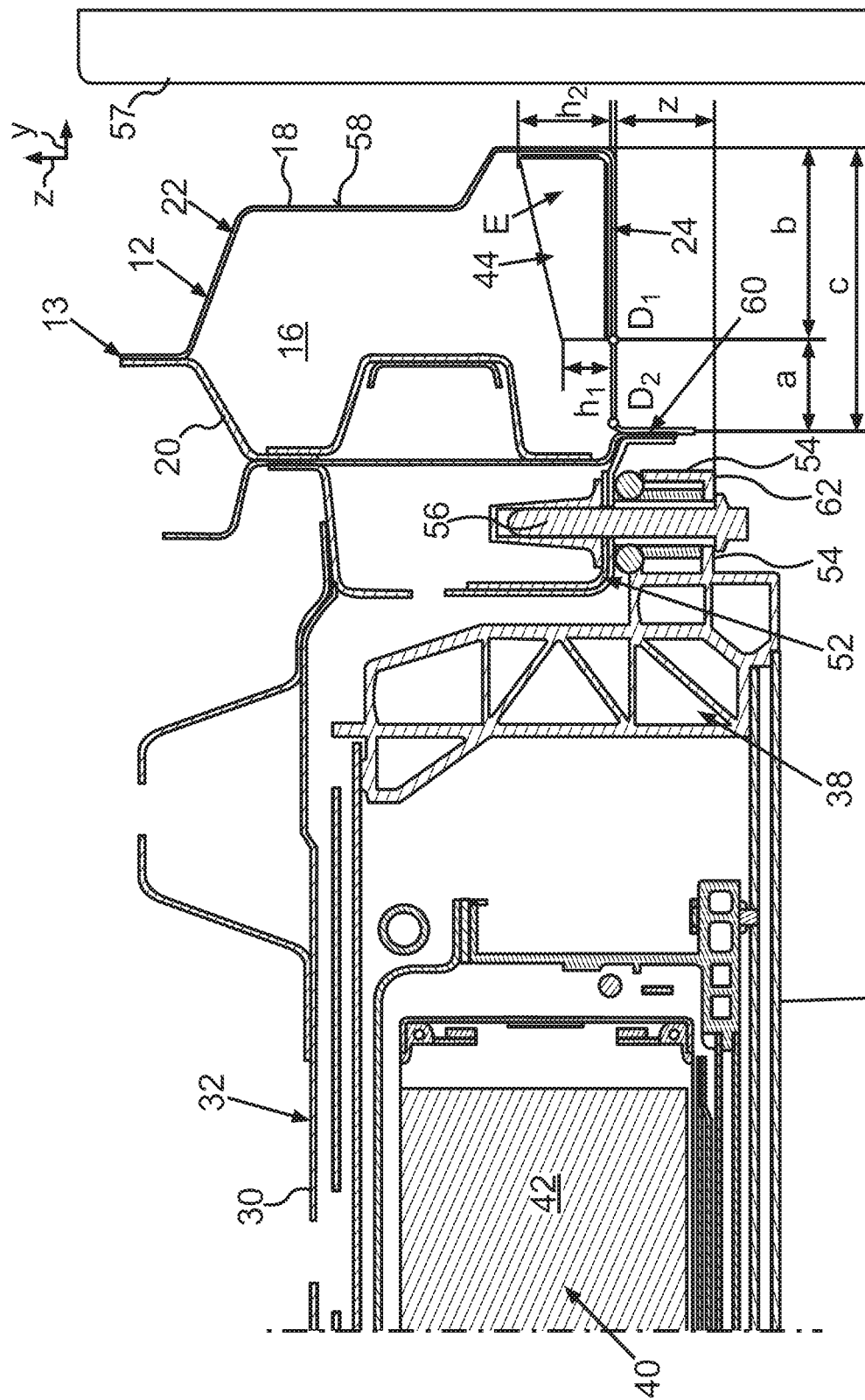
FIG. 5 shows a further partial, schematic section of a front view of the undamaged bodywork support structure, directly before a side impact of a collision partner.
Figure 6:
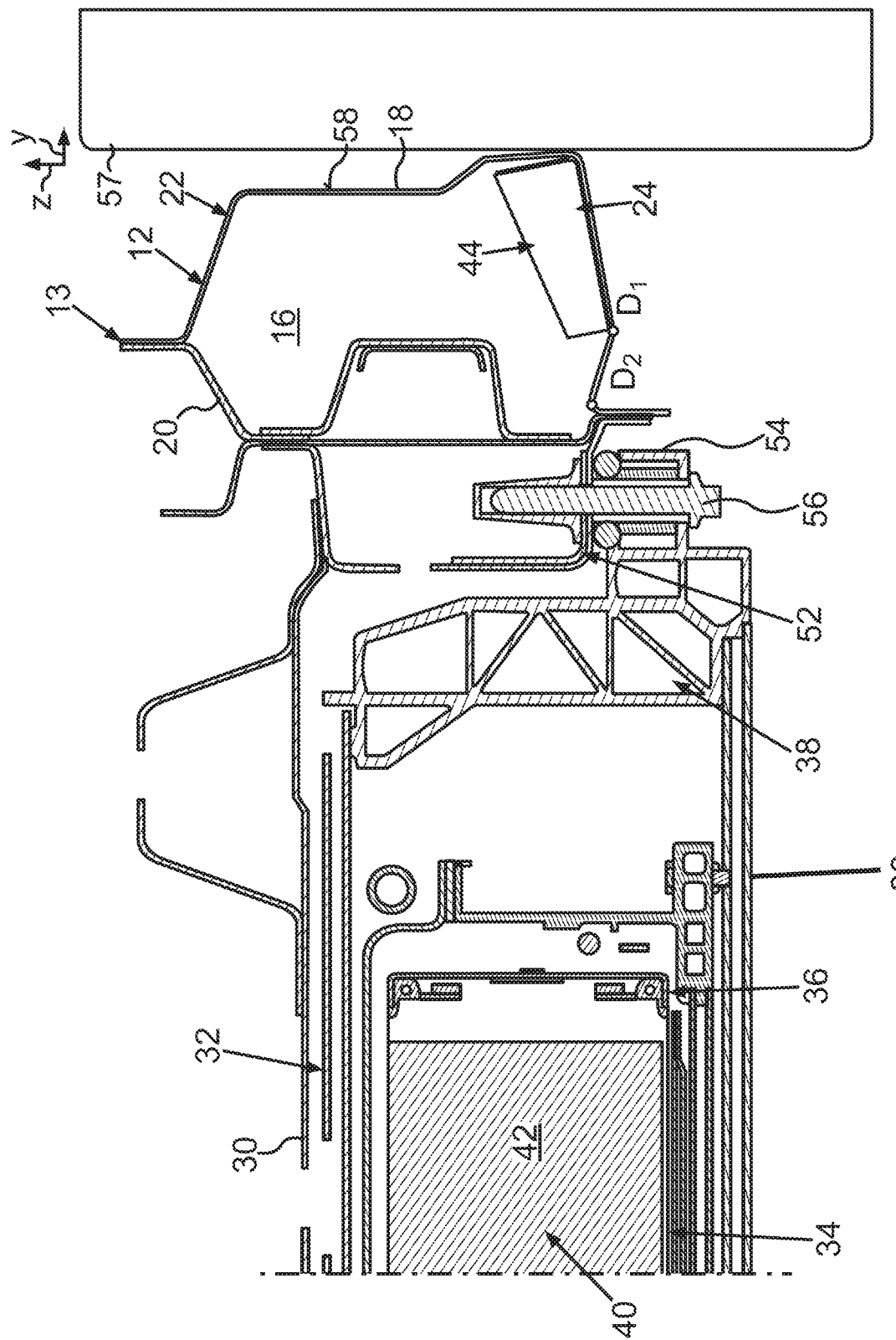
FIG. 6 shows a partial, schematic section of a front view of the bodywork support structure at a first point in time after the beginning of the side impact.
Figure 7:
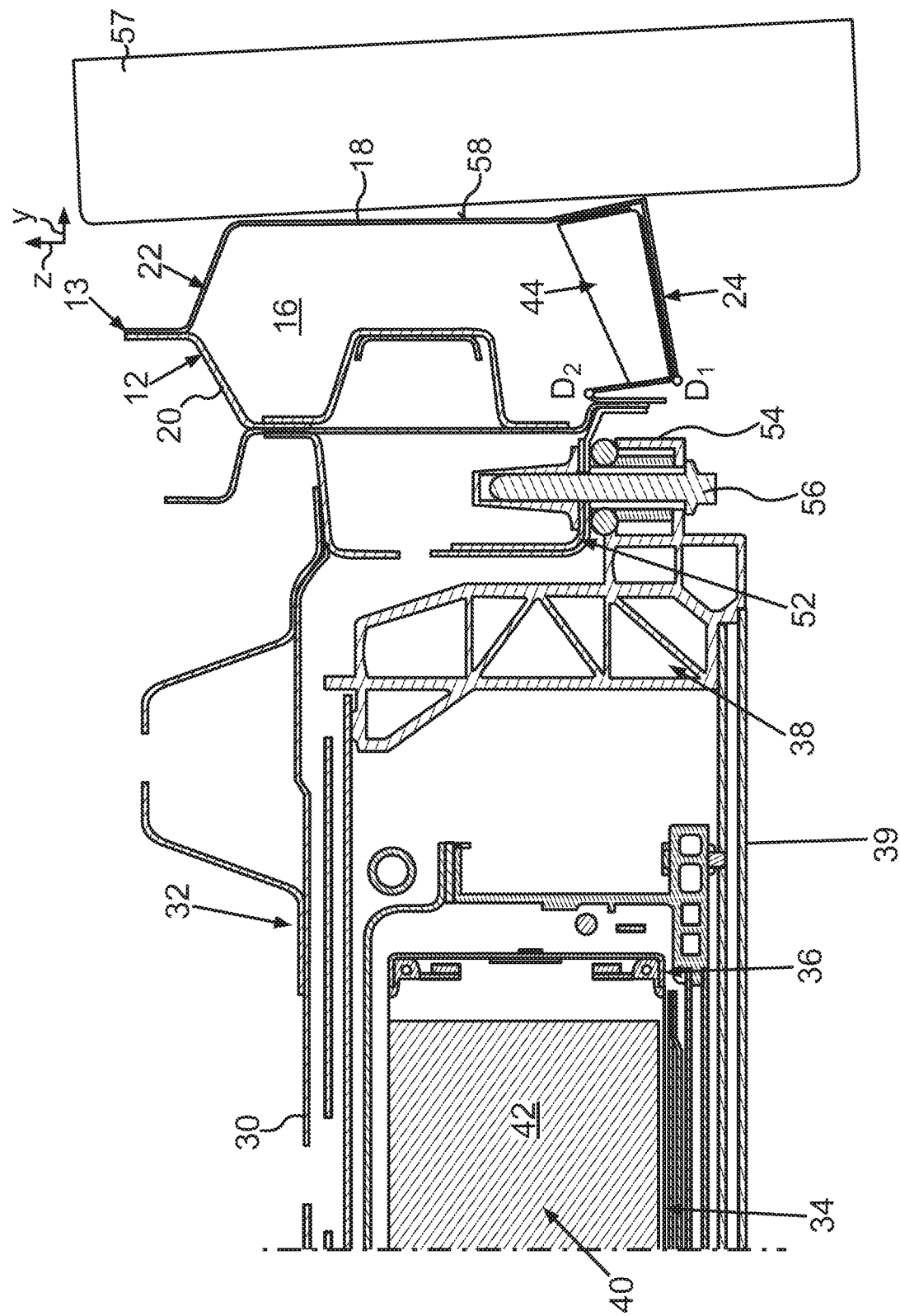
FIG. 7 shows a partial, schematic section of a front view of the bodywork support structure at a second point in time, that follows the first point in time, during the side impact.

As can be especially well identified from FIGS. 2 to 4, the respective corner reinforcement 44 has a length that runs in the longitudinal direction of the vehicle (x). The energy store 34, in particular the storage area 40, is also at least partially covered or overlapped by the respective corner reinforcement 44, on the outside in the transverse direction of the vehicle. It can be identified from FIG. 2 that the several corner reinforcements 44, that are arranged in the corner area E and are spaced apart from each other and arranged consecutively to each other in the longitudinal direction of the vehicle, form at least or exactly one reinforcement line R, wherein the energy store 34, in particular its storage area 40, is at least partially overlapped or covered by the reinforcement line R on the outside in the transverse direction of the vehicle.

In the exemplary embodiments shown in the figures, the respective corner reinforcement 44 is formed in a wedge shape, wherein the respective, wedge-shaped corner reinforcement 44 tapers inwards in the transverse direction of the vehicle. A fastening of the energy store 34 does not occur on the lower flanges of the side sills, rather it is offset inwards in the transverse direction of the vehicle. Therefore, a holding device 52, also referred to as a holder or battery holder, connects to the side sills 12 and to the other side sills on the inside in the transverse direction of the vehicle, which is attached, in particular directly, to a respective inner side of the respective side sill, which faces inwards in the transverse direction of the vehicle, in particular of the respective internal wall 20. The support structure 38 or the energy store 34 is thus exclusively attached to the holding device 52, so that a direct attachment of the energy store 34 to the side sill is omitted. In other words, the energy store 34 is exclusively held on or fixed to the side sills and/or the floor 30 via the holding device 52. It is hereby preferably provided that the support structure 38 and thus the energy store 34 are fixed to the holding device 52 in a reversibly detachable manner. To this end, the energy store 34, in particular the support structure 38, has at least one fastening flange 54, in particular per side sill. The energy store 34 is fixed to the holding device 52 via the fastening flange 54. A connecting element 56, preferably formed as a screw element or screw, is hereby provided, which is formed separately from the energy store 34 and separately from the holding device 52. The connecting element 56 passes through a corresponding through-opening of the fastening flange 54 and is, in particular directly, screw-connected with the holding device 52, in particular screwed into the holding device 52. The energy store 24 is therefore fixed to the holding device 52, and via this, to the side sills, in particular in a reversibly detachable manner, via its support structure 38, by means of the connecting element 56. The fastening flange 54 is arranged, at least partially, further downwards in the vertical direction of the vehicle than the respective lower flange 24 or underneath the lower flange 24.

The previously mentioned axes $D_1$ and $D_2$ can respectively be formed as articulation or bending axes, which either form spontaneously during deformation of the side sill, or alternatively, at least a corresponding weakening of the lower flange in the respective area is provided, in order that these should buckle downwards. The axis $D_2$ on the lower flange 24, around which the corner reinforcement 44 is guided and moved downwards and inwards in the case of a buckling of the lower flange 24 caused by a side impact, is provided directly on the end wall that is arranged opposite to the internal wall 20 of the side sill 12, i.e., the profile height $h_1$, of the corner reinforcement 44. In the exemplary embodiment illustrated in FIGS. 1 to 8, the axis $D_1$, that is provided or forms on the lower flange 24, is directly on the lower attaching flange, between the internal wall 20 and external wall 18 of the side sill 12.

FIGS. 5 to 8 show the bodywork support structure 10 and in particular its behavior in a side impact, also referred to as a side collision, in which context a crash barrier/crash opponent 57 collides against the vehicle inwards in the transverse direction of the vehicle and in particular against the side sill 12. In particular, the crash barrier/crash opponent 57 collides against an outer side 58 of the side sill 12 that faces outwards in the transverse direction of the vehicle. By means of the reinforcement of the side sill 12 in its corner area E that is caused by means of the corner reinforcement 44 and in particular by means of a respective shape or design of the respective corner reinforcement 44, the lower flange 24 of the side sill 12 buckles downwards in the vertical direction of the vehicle during the side impact, along an axis $D_1$ that runs, for example, at least in the longitudinal direction of the vehicle, whereby the corner reinforcement 44 is offset in a movement that occurs downwards and inwards, around an axis $D_2$ that runs, for example, at least in the longitudinal direction of the vehicle. In the further course of the side impact, the corner reinforcement 44 is supported with its profile height $h_1$ at least substantially evenly and at least indirectly and hereby, for example, via the lower flange 24 on or against the support structure 38 of the energy store 34, whereby an excessive intrusion into the passenger compartment and into an installation space in which the energy store 34 is arranged is avoided. It is preferably provided that a profile height $h_2$ of the corner reinforcement 44 that is on the outside in the transverse direction of the vehicle, the profile height $h_2$ of which corner reinforcement 44 runs in the vertical direction of the vehicle and is preferably the largest profile height of the corner reinforcement 44 that runs in the vertical direction of the vehicle, is larger than the profile height $h_1$ of the corner reinforcement 44 that is on the inside in the transverse direction of the vehicle. The corner reinforcement 44 is thus, for example, formed in a wedge shape in such a way that the wedge-shaped corner reinforcement 44 tapers inwards in the transverse direction of the vehicle. The corner reinforcement 44 has a width b that runs in the transverse direction of the vehicle, which is smaller than a width c of the lower flange 24 that runs in the transverse direction of the vehicle. Consequently, a distance a running in the transverse direction of the vehicle is arranged or exists between the corner reinforcement 44 and the internal wall 20 and/or an end of the lower flange 24, that is on the inside in the transverse direction of the vehicle, in the transverse direction of the vehicle, wherein the lower flange 24 is free of the corner reinforcement 44 across the distance a and is thus not reinforced by the corner reinforcement 44. The width a is, for example, a width of the non-reinforced area B of the lower flange 24 that runs in the transverse direction of the vehicle.

In particular, the distance a can be a distance between the corner reinforcement 44 and a lower connection area 60 that runs in the transverse direction of the vehicle, in which the side sill 12 or the side wall structure 13 is connected with the chassis structure 32 or with the holding device 52, wherein the holding device 52 can be a component of the chassis structure 32. Preferably, the distance a is larger than the inner profile height $h_1$. Furthermore, it is preferably provided that the distance a is smaller than a distance z, that runs vertically or in the vertical direction of the vehicle, between the lower flange 24 and a lower edge 62 of the fastening flange 54, in particular the lowest in the vertical direction of the vehicle. It can also preferably be provided that the distance a is larger than the inner profile height $h_1$, so that $z>a>h1$ preferably applies.

By applying several or different amounts of corner reinforcements 44 and/or by applying corner reinforcements 44 that are different lengths or are extended to positions that are advantageous and, for example, necessary for the energy store 34 or for different energy stores, a modular system can be created, which can serve to strengthen the side sill 12, in particular for vehicles or different vehicle derivatives that are based on a common plate shape, but have different requirements for the protection of the respective energy store 34. The vehicle derivatives can in particular differ from each other regarding their respective energy store, so that a first of the energy stores is formed, for example, as a gas tank, a second of the energy stores is formed, for example, as a fuel tank and a third of the energy stores is formed, for example, as an electrical energy store. In other words, by varying the amount of the corner reinforcements 44 and/or by varying the size, in particular the length of the corner reinforcements 44 running in the transverse direction of the vehicle and/or the length of the corner reinforcements 44 running in the longitudinal direction of the vehicle, the corner reinforcement 44 of the side sill 12 can be appropriately and modularly stiffened, and adapted to different requirements. To this end, the modular system comprises, for example, the side sill 12 that applies for all design variants and several corner reinforcements 44, which can optionally be used in order to appropriately reinforce the corner area E. An advantageous protection of the energy store 34 and an advantageous protection of occupants of the vehicle can thereby be realised in a cost-, weight- and space-efficient way, wherein the side sill 12 can be modularly adapted to different requirements and in particular to different powering technologies.

Figure 8:
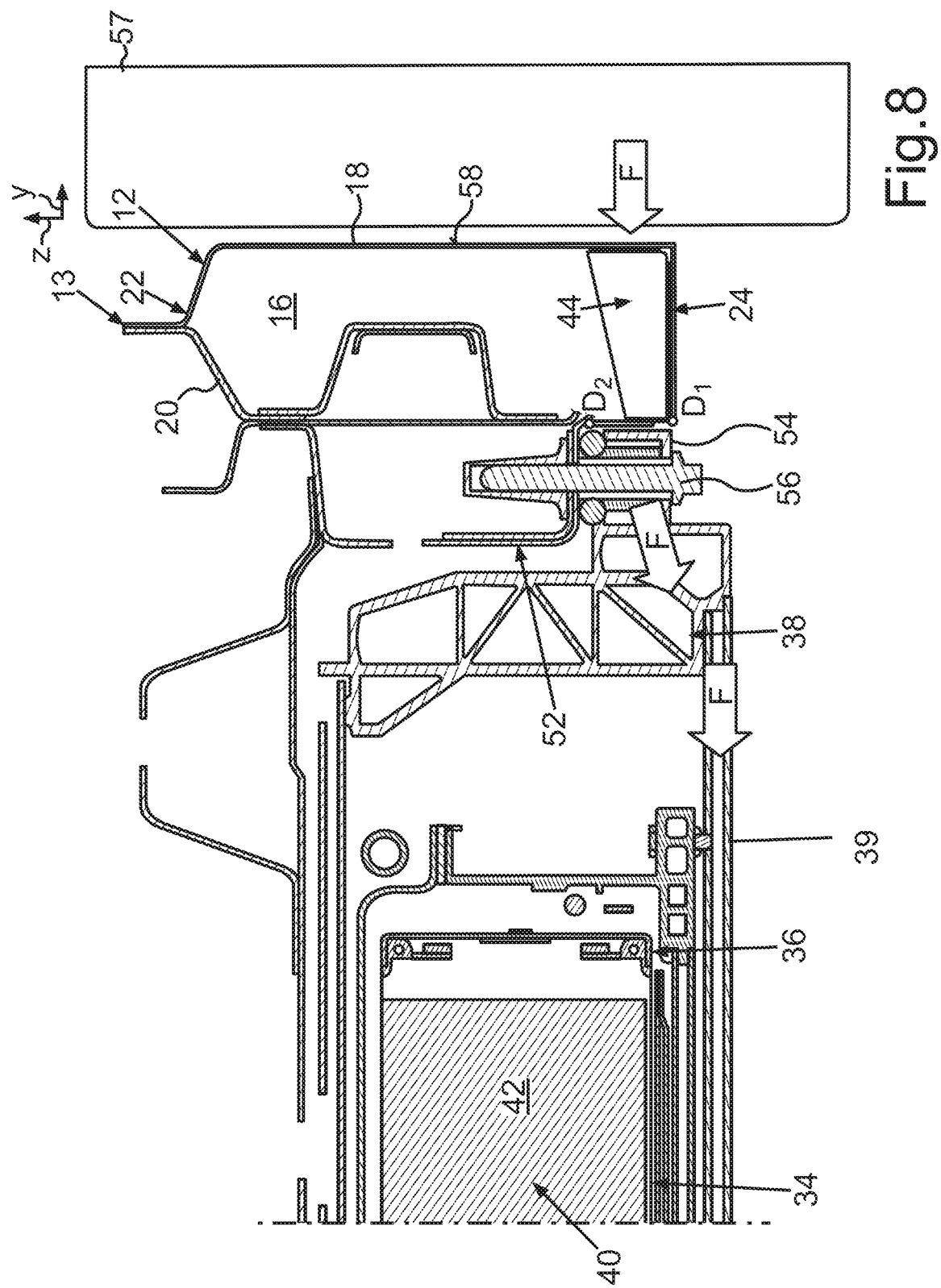
FIG. 8 shows a partial, schematic section of a front view of the bodywork support structure at a third point in time, that follows the second point in time, during the side impact.

It can in particular be identified from FIGS. 5 to 8 that, by means of the targeted stiffening of the corner area E by means of the corner reinforcement 44 and because the corner reinforcement 44 is spaced apart from the internal wall 20 in forming the non-reinforced area B, the side sill 12 is deformed as a result of the side impact, in particular in the non-reinforced area B of the lower flange 24, in such a way that the corner reinforcement 44 is displaced inwards and downwards in the transverse direction of the vehicle and as a result, a block forms between the crash barrier/crash opponent 57 and the energy store 34, in particular the support structure 38, in the transverse direction of the vehicle. By means of this block, an advantageous additional load path, which is illustrated in FIG. 8 by arrow F, forms, via which loads caused by an accident or crash energy can be especially advantageously guided around the actual storage area 40. The actual storage area 40 and thus the storage cells arranged in it are thereby advantageously protected from excessive loads.

The invention claimed is:

1. A bodywork support structure for a vehicle, comprising:
    two side sills that are spaced apart from each other in a transverse direction of the vehicle, wherein each of the two side sills respectively have a hollow space that is delimited outwards in the transverse direction of the vehicle by an external wall, inwards in the transverse direction of the vehicle by an internal wall, upwards in a vertical direction of the vehicle by an upper flange and downwards in the vertical direction of the vehicle by a lower flange and wherein a reinforcing element is disposed in the hollow space which is formed separately from the respective side sill;
    a floor is disposed between the two side sills and connected to the two side sills; and
    an energy store for storing electrical energy and/or a fuel for powering the vehicle is disposed under the floor;
    wherein the reinforcing element is formed as a corner reinforcement disposed in a corner area delimited by the lower flange and by the external wall, wherein the corner reinforcement extends across a corner, wherein the corner reinforcement has a first connection area that is attached to the external wall, a second connection area that is attached to the lower flange, and a wall area that extends in the transverse direction of the vehicle and in the vertical direction of the vehicle and across the corner and connects the first and second connection areas with each other across the corner, and wherein the corner reinforcement is spaced apart from the upper flange in the vertical direction of the vehicle and from the internal wall in the transverse direction of the vehicle such that an open space is formed between the corner reinforcement and the internal wall in the transverse direction of the vehicle.

2. The bodywork support structure according to claim 1, wherein a first axis that runs in a longitudinal direction of the vehicle is disposed on the lower flange in an area between the corner reinforcement and the internal wall and wherein around the first axis the lower flange buckles downwards in the vertical direction of the vehicle in an event of a side impact of a crash barrier against an outer side of the side sill.

3. The bodywork support structure according to claim 2, wherein a second axis that runs in the longitudinal direction of the vehicle is disposed on the lower flange in the area between the corner reinforcement and the internal wall and wherein around the second axis the corner reinforcement is displaced downwards in a movement occurring downwards in the vertical direction of the vehicle and inwards in the transverse direction of the vehicle in an event of a buckling of the lower flange caused by the side impact.

4. The bodywork support structure according to claim 3, wherein, due to a deformation of the lower flange caused by the side impact, the corner reinforcement forms a block between the crash barrier and a support structure of the energy store in the transverse direction of the vehicle.

5. The bodywork support structure according to claim 4, wherein the block has a receiving chamber for storage cells for electrical energy and/or for the fuel for powering the vehicle close to or directly above a base plate of the energy store in the vertical direction of the vehicle.

6. The bodywork support structure according to claim 1, wherein the corner reinforcement is wedge shaped.

7. The bodywork support structure according to claim 6, wherein the corner reinforcement tapers inwards in the transverse direction of the vehicle.

8. The bodywork support structure according to claim 1, wherein the lower flange has no reinforcement in an area of the open space between the corner reinforcement and the internal wall.

9. The bodywork support structure according to claim 3, wherein the second axis disposed on the lower flange is provided directly on an end wall of the corner reinforcement that is disposed opposite to the internal wall of the side sill.

10. The bodywork support structure according to claim 1, wherein the energy store is at least partially outwardly covered in the transverse direction of the vehicle by a respective side sill and/or a respective corner reinforcement.

11. The bodywork support structure according to claim 1, further comprising holding devices connected to a respective side sill on an inside in the transverse direction of the vehicle and fixed to the respective side sill and/or to the floor, wherein the energy store is fixed to the holding devices.

12. The bodywork support structure according to claim 11, wherein respective fastening flanges of the energy store are fixed to the holding device and wherein the fastening flanges are at least partially disposed lower down in the vertical direction of the vehicle than the respective lower flanges.

13. The bodywork support structure according to claim 1, wherein the two side sills are formed in a shell construction or as an extruded profile.

14. A vehicle, comprising:
the bodywork support structure according to claim 1.

* * * * *